United States Patent [19]

Vogel

[11] 4,310,196

[45] Jan. 12, 1982

[54] VEHICLE PASSENGER SEAT

[76] Inventor: Ignaz Vogel, Kleinsteinbacher Str., 42-44 Karlsruhe 41-Stu, Fed. Rep. of Germany, 7500

[21] Appl. No.: 124,432

[22] Filed: Feb. 25, 1980

[30] Foreign Application Priority Data

Feb. 26, 1979 [DE] Fed. Rep. of Germany ....... 2907463

[51] Int. Cl.³ .............................................. A47C 7/54
[52] U.S. Cl. .................................................. 297/417
[58] Field of Search ....................... 297/417, 413, 415

[56] References Cited

U.S. PATENT DOCUMENTS

| | | | |
|---|---|---|---|
| 651,539 | 6/1900 | Warren | 297/417 |
| 3,116,093 | 12/1965 | Bosack | 297/417 |
| 3,168,346 | 2/1965 | Rei, Jr. | 297/113 |
| 3,778,103 | 12/1973 | Edwards | 297/359 |
| 4,125,287 | 11/1978 | Paulisch | 297/417 |
| 4,159,148 | 6/1979 | Schulz | 297/417 |
| 4,244,623 | 1/1981 | Hall et al. | 297/417 |

FOREIGN PATENT DOCUMENTS 1630103 8/1971 Fed. Rep. of Germany ...... 297/417

Primary Examiner—Francis K. Zugel
Attorney, Agent, or Firm—Klaus J. Bach

[57] ABSTRACT

A vehicle passenger seat which includes a seat member and a backrest member has pivotal armrest associated with the seat member. The seat member has side portion provided at their rear ends with upstanding armrest carriers having at their upper ends crank portions which project forwardly a distance corresponding to the thickness of the armrests. The armrests are pivotally supported on the forwardly projecting crank portions such that they can be pivoted fully upwardly or fully downwardly into positions in which they are disposed adjacent the backrest. The armrests include latching mechanisms for locking the armrests in predetermined use positions.

3 Claims, 4 Drawing Figures

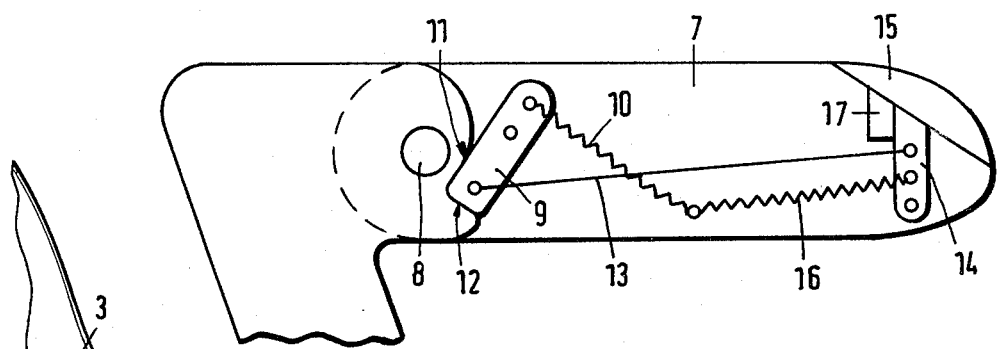
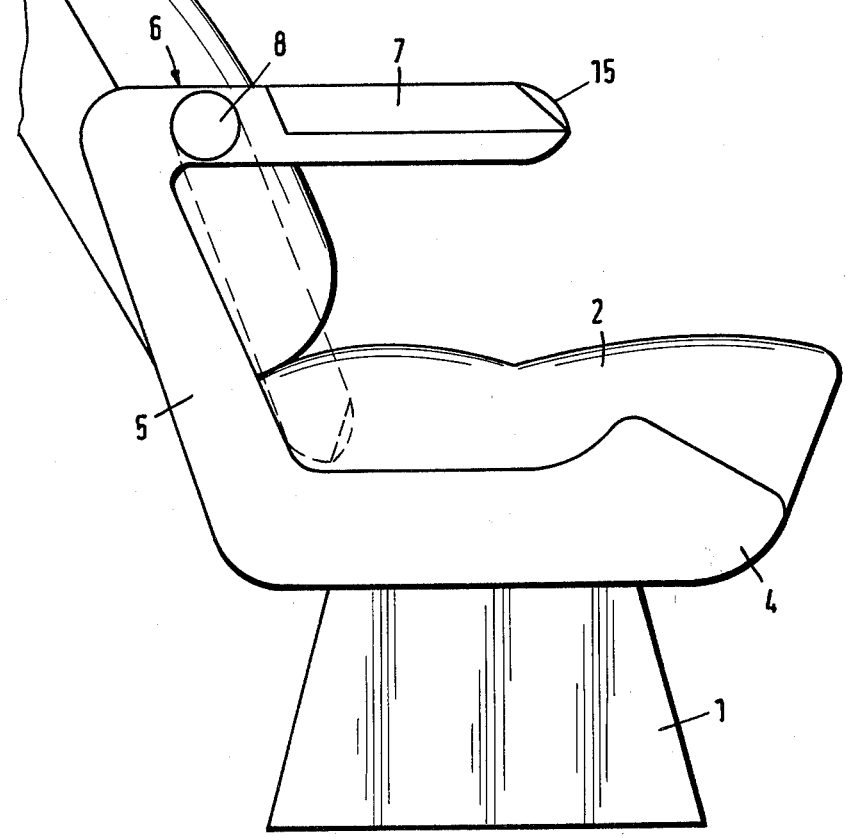

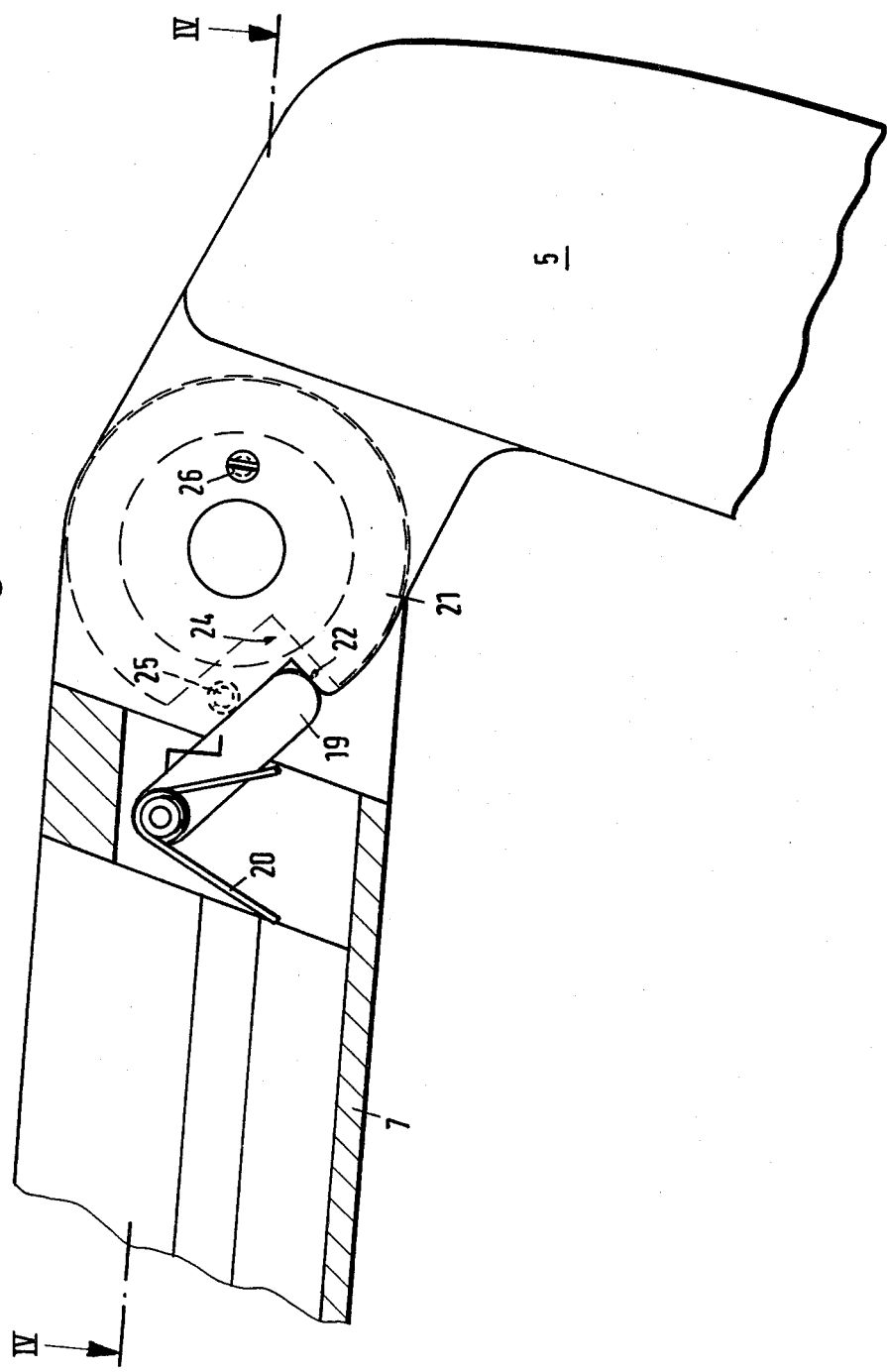

VEHICLE PASSENGER SEAT

BACKGROUND OF THE INVENTION

1. Field of the Invention

The present invention relates to a vehicle passenger seat with hinged armrests which are lockable in use position.

2. Description of the Prior Art

Passenger seats with armrests which are mounted on the seat base are known. There is known, for example, an upwardly offset armrest which is mounted on an armrest carrier tiltably about an axis extending parallel to the armrest and in which the armrest is lockable in both the upper and the lower end position. Such an arrangement is quite suitable and requires only a relatively small armrest carrier but difficulties arise in operating such armrest mainly because the passengers are used to armrests which can be tilted up or down by their front end. Such armrests are therefore usually not swung down by the passengers resulting not only in difficulties in taking a seat but also sometimes in injuries to the passengers particularly if the vehicle accelerates before the passengers have taken their seats.

There are further passenger seats known in which the armrests are mounted on the backrest tiltably about an axis transverse to the seat. With such an arrangement however the position of the armrest changes when the backrest is reclined and such arrangements are therefore not suitable for recliner seats or they have to include a ratchet mechanism allowing for various positions of the armrest relative to the backrest which positions need to be adjusted each time the backrest position is changed. Generally, in order to swing the armrest down, the ratchet mechanism has to be held disengaged until the armrest is completely pivoted down. Upwardly, the armrest can be pivoted until the ratchet engages the proper armrest position. Such armrests are generally without problems for the passenger but the optional angular position of the armrest is not always readily found and may not exist for certain backrest positions. Furthermore, the ratchet mechanism is complicated and relatively expensive to manufacture. Also, furthermore, the armrest usually protrudes from the seatback upholstery even when fully tilted down which may still cause injuries.

It is therefore desirable to provide a vehicle passenger seat with an armrest whose position remains unaffected by the reclining of the backrest and which is pivotal in the conventional manner, that is, about a transverse axis. Upon such pivoting of the armrest out of a locked use position which is possible simply by operating a release mechanism the armrest should not protrude from the upholstery of the backrest and the seat portion.

SUMMARY OF THE INVENTION

In a vehicle passenger seat having a seating member, a backrest member and armrests, the seating member has side portions provided at their rear ends with armrest carriers, extending upwardly generally in alignment with the backrest in a normal sitting position and having at their upper ends crank portions projecting forwardly a distance corresponding to the thickness of the armrest. The armrest is pivotally supported on said crank portion and includes a pawl mechanism for locking said armrest in its use position. By supporting the armrest on a slightly projecting crank portion the armrest can be pivoted down fully against the armrest carrier such that the armrest can be moved fully out of the way and into the backrest area. Passengers can therefore not be injured when using the seats. It is also possible to swing the armrest upwardly. This is in accordance with the normal arrangements so that a passenger can move the armrest out of the way in the normal manner if he is not familiar with the specific operation of this seat. The pawl mechanism is suitably so arranged that it is possible to pivot the armrest upwardly without a release mechanism. Downward pivoting can be achieved upon actuation of the release mechanism.

The mechanism consists of a pawl pivotally supported within the armrest and spring biased into abutment with a notched disc portion at the front end of the crank portion of the armrest carrier. The abutment for the pawl is preferably formed by a step in a curved disc portion. In this manner, the pawl always abuts the curved disc portion even when the armrest is pivoted out of its use position. Friction between the pawl and the curved disc member will then hold the armrest in any angular position but it is even more important that this will prevent rattling. In order to avoid rattling of the armrest also in its use position the notch in the curved disc portion is only deep enough that the pawl always remains in engagement with a flat area of the curved surface of the disc portion adjacent the notch. As a result of such a flat abutment surface, the spring biased pawl does not only hold the armrest in its use position with the pawl engaged in the notch of the disc portion but the armrest will automatically be pulled into use position beginning at a certain angle before reaching use position. This not only facilitates handling of the armrest but also assures an equal use position of the armrests of all the seats in a vehicle which provides for attractive appearance of the vehicle seats.

A simple operating mechanism for the pawl is provided by an operating level mounted at the front end of the armrest and operatively linked to the pawl. Preferably, the front end portion of the armrest forms the lever handle. For the release of the armrest it is then merely necessary to press the front end of the armrest downwardly. This causes disengagement of the pawl whereupon the armrest swings downwardly. Suitably, the operating lever is linked with the pawl by a pull rope.

In a very simple and easily operable latch mechanism in accordance with the invention, the notched disc portion of the latch mechanism is essentially round with a single step-forming notch therein and has a thickness somewhat smaller than the width of the pawl. Adjacent to and coaxial with the notched disc portion there is provided a thin blocking disc which is rotatably supported and has a somewhat larger step forming notch therein than the notched disc portion. Rotation of the blocking disc is possible by means of a keeper pin connected to the armrest and extending into the notch of the blocking disc. Preferably, the notched disc portion is provided with an indexing mechanism including a ball front portion which is biased against the blocking disc. The blocking disc has a hole which receives the ball of the indexing mechanism when the blocking disc is in a position in which the notch of the blocking disc is in alignment with the notch of the notched disc portion.

With this arrangement of the latch mechanism the pawl will be moved out of the notch of the notched disc portion when the armrest is pivoted upwardly. At the same time, the blocking disc is rotated by the keeper pin so that the circular area of the blocking disc covers the notch of the notched disc portion. Upon downward pivoting of the armrest, the pawl is prevented from entering the notch in the notched disc portion but is guided over the notch. Further downward pivoting of the armrest will cause engagement by the keeper pin of the opposite end wall of the notch of the blocking disc and will rotate the blocking disc into a position in which its notch is again in alignment with the notch of the notched disc member in which position the indexing pin engages the indexing hole in the blocking disc. Upon subsequent upward pivoting of the armrest, the pawl is again permitted to enter the notch in the notched disc portion to secure the armrest in its use position. In order to avoid unintended rotation of the blocking disc friction discs may be arranged at opposite sides thereof.

BRIEF DESCRIPTION OF THE DRAWINGS

FIG. 1 is a side view of a vehicle passenger seat;
FIG. 2 shows one embodiment of a latch mechanism;
FIG. 3 is a cross-sectional view along lines III—III of FIG. 4.

DESCRIPTION OF THE PREFERRED EMBODIMENTS

Figure 4:
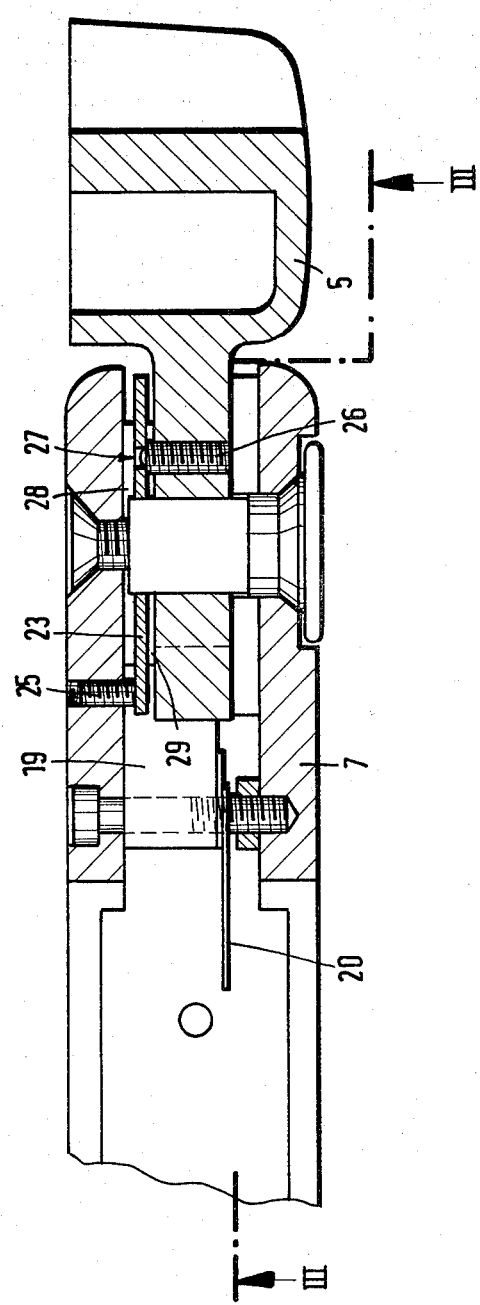
FIG. 4 is a cross-sectional view along lines IV—IV of FIG. 3.

FIG. 1 shows a vehicle passenger seat with a seat base 1, a seat upholstery 2 and a reclining seat back 3. At its sides the seat has side members 4 which, at their rear ends, have upstanding armrest carriers 5. At their upper ends, the armrest carriers 5 have forwardly projecting crank portions 6, on which armrests 7 are supported pivotally about an axis 8 extending transverse to the seat. Within each armrest 7 there is a pivotal pawl 9 biased by a spring 10 onto the flat surface 11 of a notch 12 in a disc portion of the crank portion 6. The pawl 9 is actuated by a pull string 13 which is connected to an operating lever 14 having a handle 15 formed as the front end of the armrest 7. The operating lever 14 has a return spring 16 associated therewith which spring forces the lever 14 to its rest position against a stop 17 wherein the handle 15 is properly positioned at the front end of the armrest 7.

The armrest 7 can be tilted upwardly out of its use position as shown in FIG. 1 whereby the pawl 9 is moved out of the disc notch 12 and abuts a circular part of the disc portion 21. The pawl 9 will always firmly abut the outer surface of the notched disc portion 21 under the force of spring 10 so that rattling of the armrest and the pawl is prevented. In order to permit downward tilting of the armrest 7 the pawl 9 must be moved out of notch 12 by actuating the operating lever 14. This is conveniently done by moving the handle 15 of the armrest 7. Then, not only will the pawl become disengaged but the armrest 7 is moved downwardly at the same time into the position shown in FIG. 1 in dashed lines. In this position (as shown in dashed lines) the armrest is fully within the area of the seat upholstery without any protruding parts which might cause injuries. When tilted upwardly, the armrest 7 is also in close proximity of the upholstery of the backrest 3, a position in which passengers can hardly be injured by the armrest 7.

Another embodiment of a latching mechanism is shown in FIGS. 3 and 4. As shown therein, a pawl 19 is forced by a spring 20 into abutment with a notched disc portion 21 in whose notch 22 a pawl 19 is received. Coaxially arranged with the notched disc 21 is a thin blocking disc 23 which also has a notch 24. A keeper pin 25 which is mounted on the armrest 7 extends into the notch 24 of the blocking disc 23 so that, upon tilting of the armrest 7, the keeper pin 25 engages the edges defining the notch 24 and rotates the blocking disc 23. A ball headed indexing pin 26 is arranged in the notched disc portion 21 of the crank portion 6 and the blocking disc 23 has an indexing hole 27 so arranged that the indexing pin 26 can enter when the notches 22 and 24 of the notched disc portion 21 and the blocking disc are aligned. At both sides of the blocking disc 23, there are friction discs 28 and 29.

Upon upward tilting of the armrest 7, the pawl 19 is forced out of the notch 22 such that it tangentially abuts the circular area of the retaining disc portion 21. At the same time, the disc 23 is rotated by the keeper pin 25 such that the blocking disc 23 covers the notch 12 of the notched disc portion 21. When the armrest 7 is now pivoted downwardly, the pawl 19 is prevented from entering the notch 22; it rather rides along the edge of blocking disc 23 over the notch 22. After the pawl 19 is guided across the notch 22 the keeper pin 25 engages the opposite wall of the notch 24 of the blocking disc 23 so that, upon further downward tilting of the armrest 7, the blocking disc 23 is returned to the position as shown in FIG. 3, wherein the notches 22 and 24 of the disc portion 21 and blocking disc 23 are aligned. In this position, the indexing pin 26 engages with its ball front portion the indexing hole 27 in the blocking disc thereby holding the blocking disc 23 in position. When the armrest 7 is then again pivoted upwardly the pawl 19 is permitted by the blocking disc 23 to enter the notch 22 of the notched disc portion 21 so as to hold the armrest 7 in use position.

What is claimed is:
1. Vehicle passenger seat comprising: a seating member; a backrest member associated with said seating member; and an armrest associated with seating member, said seating member including a side portion provided at its rear end with an upstanding armrest carrier having at its upper end a crank portion projecting forwardly a distance corresponding to the thickness of said armrest and having at its front end a circular sectional disc portion which has a notch formed therein, said armrest being pivotally supported on said crank portion such that said armrest can be pivoted upwardly and downwardly and enclosing a latching mechanism for locking the armrest in a predetermined use position, said latching mechanism including a pawl pivotally supported in said armrest and biased to be received in said notch when said armrest is in the use position, a narrow blocking disc mounted adjacent said disc portion rotatably about the pivot axis of said armrest, said blocking disc having a notch at least corresponding to the notch of said disc portion and said armrest being provided with a keeper pin extending into the notch of said blocking disc so as to cause rotation of said blocking disc when one of the edges forming said notch is engaged by said keeper pin, said pawl having a width at least equal the combined thickness of said disc portion and said blocking disc, said latch mechanism including means for controlling the position of said blocking disc, said blocking disc preventing said pawl from entering the notch of said disc portion when it is prevented by the blocking disc upon upward pivoting of said armrest thereby causing said pawl to ride over the notch in said disc portion for downward pivoting of said armrest.

2. Vehicle passenger seat as recited in claim 1, wherein said disc portion includes an indexing means biased against said blocking disc and said blocking disc has an indexing opening so arranged as to receive said indexing means when the notches of said blocking disc and said disc portion are in alignment.

3. Vehicle passenger seat as recited in claim 1 or 2, wherein a friction disc is provided at least at one side of said blocking disc for holding said blocking disc in position when not moved by said keeper pin.

* * * * *